United States Patent
Hung et al.

(10) Patent No.: US 8,394,905 B2
(45) Date of Patent: *Mar. 12, 2013

(54) FLUOROPOLYMERS HAVING DIACRYLATE ENDS

(75) Inventors: Ming-Hong Hung, Wilmington, DE (US); Bruno Ameduri, Montpellier (FR); Georgi Kostov, Burgas (BG)

(73) Assignees: E I du Pont de Nemours and Company, Wilmington, DE (US); Le Centre National de la Recherche Science (FR)

( * ) Notice: Subject to any disclaimer, the term of this patent is extended or adjusted under 35 U.S.C. 154(b) by 625 days.

This patent is subject to a terminal disclaimer.

(21) Appl. No.: 12/504,267

(22) Filed: Jul. 16, 2009

(65) Prior Publication Data

US 2011/0015358 A1    Jan. 20, 2011

(51) Int. Cl.
*C08F 16/24* (2006.01)

(52) U.S. Cl. ........ 526/247; 526/242; 526/254; 526/255; 560/223; 560/225

(58) Field of Classification Search .................. 560/223, 560/225; 526/242, 247, 254, 255; 528/401
See application file for complete search history.

(56) References Cited

U.S. PATENT DOCUMENTS

| | | | |
|---|---|---|---|
| 6,929,899 B2 * | 8/2005 | Pottebaum et al. | 430/285.1 |
| 2008/0081195 A1 * | 4/2008 | Chung et al. | 428/421 |
| 2009/0036706 A1 | 2/2009 | Murata et al. | |
| 2009/0105435 A1 | 4/2009 | Hung et al. | |

FOREIGN PATENT DOCUMENTS

FR    2810668 A1 * 12/2001

* cited by examiner

*Primary Examiner* — Nicole M Buie-Hatcher

(57) ABSTRACT

Disclosed herein is a telechelic diacrylate fluoropolymer and a process for manufacture of the fluoropolymer. The diacrylate copolymer is of formula $CH_2=CR'COO-(CH_2)_n-R-(CH_2)_n-OOCCR'=CH_2$, wherein R is selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro (methyl vinyl ether), and iv) an oligomer comprising copolymerized units of tetrafluoroethylene and a hydrocarbon olefin, R' is H or $-CH_3$, n is 1-4 and wherein said oligomer has a number average molecular weight of 1000 to 25,000 daltons.

4 Claims, No Drawings

FLUOROPOLYMERS HAVING DIACRYLATE ENDS

FIELD OF THE INVENTION

This invention relates to diacrylate copolymers of formula $CH_2=CR'COO—(CH_2)_n—R—(CH_2)_n—OOCCR'=CH_2$, wherein R is selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin, R' is H or $—CH_3$, n is 1-4, and wherein said oligomer has a number average molecular weight of 1000 to 25,000 daltons.

BACKGROUND OF THE INVENTION

Difunctional low molecular weight (number average molecular weight between 1000 and 25,000 daltons) copolymers of vinylidene fluoride ($VF_2$) with perfluoro(methyl vinyl ether) (PMVE) and difunctional copolymers of tetrafluoroethylene (TFE) with PMVE have been disclosed in US 20090105435 A1. A functional group is located at each end of the copolymer main chain (sometimes referred to as "telechelic"). Functional groups disclosed include iodine, allyl, hydroxyl, carboxyl and nitrile.

It would be desirable to have low molecular weight fluoropolymers of the type disclosed in US 20090105435 A1 wherein each end of the main polymer chain has an acrylate or methacrylate group. Such fluoropolymers could be used as intermediates in the synthesis of other fluoropolymers and could also be vulcanized to form tough coatings, seals, o-rings, gaskets etc.

SUMMARY OF THE INVENTION

The present invention is both 1) a telechelic diacrylate low molecular weight fluoropolymer and also 2) a process for the manufacture of such a copolymer.

Accordingly an aspect of the present invention is a telechelic diacrylate copolymer of formula $CH_2=CR'COO—(CH_2)_n—R—(CH_2)_n—OOCCR'=CH_2$, wherein R' is H or $—CH_3$, n is 1-4 and R is an oligomer having a number average molecular weight of 1000 to 25,000 daltons, said oligomer selected from the group consisting of i) an oligomer comprising copolymerized units of vinylidene fluoride and perfluoro (methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin.

Another aspect of the invention is a process for the manufacture of a telechelic diacrylate copolymer, said process comprising:

A) providing a diol of formula $HO—(CH_2)_n—R—(CH_2)_n—OH$, wherein n is 1-4 and R is an oligomer having a number average molecular weight of 1000 to 25,000 daltons, said oligomer selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin; and B) reacting said diol with $CH_2=CR'COX$, wherein X is a halide and R' is H or $—CH_3$, to form a diacrylate copolymer of formula $CH_2=CR'COO—(CH_2)_n—R—(CH_2)_n—OOCCR'=CH_2$.

DETAILED DESCRIPTION OF THE INVENTION

The present invention is directed to low molecular weight, telechelic diacrylate fluoropolymers and a process for the manufacture of said polymers. By the term "diacrylate" is meant that the fluoropolymers contain either two acrylate groups or two methacrylate groups per polymer chain. The acrylate or methacrylate groups are located at both ends of the main polymer chains. By "main chain" is meant the longest chain of copolymerized monomer units, i.e. not side chains or branches.

The diacrylate fluoropolymers of this invention have the formula $CH_2=CR'COO—(CH_2)_n—R—(CH_2)_n—OOCCR'=CH_2$, wherein R' is H or $—CH_3$, n is 1-4 (preferably 2 or 3) and R is an oligomer having a number average molecular weight of 1000 to 25,000 daltons, preferably 1200 to 12,000 daltons, most preferably 1500 to 5000 daltons. Oligomer, R, is selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin. Hydrocarbon olefins include ethylene (E) and propylene (P).

Optionally, oligomer, R, may further comprise at least one additional comonomer, different from the other two comonomers. Examples of such additional comonomers include, but are not limited to vinylidene fluoride ($VF_2$), hexafluoropropylene (HFP), tetrafluoroethylene (TFE) and perfluoro(methyl vinyl ether) (PMVE).

Specific examples of oligomers that may be employed in the fluoropolymers of the invention (and the diols used to make them) include, but are not limited to TFE/PMVE, $VF_2$/PMVE, $VF_2$/TFE/PMVE, TFE/PMVE/E, $VF_2$/HFP, $VF_2$/HFP/TFE, TFE/P and TFE/$PNF_2$.

Diacrylate fluoropolymers of the invention may be made by a process comprising A) providing a diol of formula $HO—(CH_2)_n—R—(CH_2)_n—OH$, wherein n and R are defined above; and B) reacting said diol with $CH_2=CR'COX$, wherein X and R' are defined above, to form a telechelic diacrylate copolymer of formula $CH_2=CR'COO—(CH_2)_n—R—(CH_2)_n—OOCCR'=CH_2$.

Diols of formula $HO—(CH_2)_n—R—(CH_2)_n—OH$ may be made from a multi-step process beginning with the corresponding α,ω-diiodo oligomers of formula I-R-I prepared generally as described in U.S. 20090105435 A1. The diiodo oligomers may be ethyleneated (or allylated) by reaction, in the presence of a radical initiator, with ethylene (or allyl alcohol, followed by the selective reduction of the iodine atoms). The resulting oligomers may then be hydrolyzed to form the diols.

Fluoropolymers of this invention are useful in forming crosslinked fluoropolymer networks having good flexibility, chemical resistance and thermal properties.

EXAMPLES

Test Methods

Number average molecular weight (Mn) was determined by size exclusion chromatography (SEC). Samples were dissolved in THF.

Analyses were performed with a Spectra-Physics chromatograph equipped with two PLgel 5 μm Mixed-C columns from Polymer Laboratories and a Spectra Physics SP8430 Refractive Index (RI) and UV detector. Tetrahydrofuran (THF) was used as eluent, with a flow rate of 0.8 mL min$^{-1}$. Standards were monodispersed poly(styrene) (PS) or poly(methylmethacrylate), purchased from Polymer Laboratories or other vendors.

Fluoropolymer and oligomer compositions and microstructures were determined by $^{19}$F and $^{1}$H NMR. The NMR spectra were recorded on a Bruker AC 200, AC, 250 and AC 400 (200, 250 and 400 MHz) instruments, using deuterated acetone as solvent and tetramethylsilane (TMS) (or CFCl$_3$) as the references for $^{1}$H (or $^{19}$F) nuclei. Coupling constants and chemical shifts are given in Hz and ppm, respectively. The experimental conditions for $^{1}$H (or $^{19}$F) NMR spectra were the following: flip angle 90° (or 30°), acquisition time 4.5 s (or 0.7 s), pulse delay 2 s (or 5 s), number of scans 16 (or 64), and a pulse width of 5 μs for $^{19}$F NMR.

Example 1

In this example, a fluoropolymer of the invention, CH$_2$=CHCOO—(CH$_2$)$_2$—R—(CH$_2$)$_2$—OOCCH=CH$_2$, wherein R is poly(vinylidene fluoride-co-perfluoro(methyl vinyl ether) [i.e. poly(VF$_2$-co-PMVE)], was made by the process of the invention.

The diol oligomer employed in the fluoropolymer manufacturing process was made from a multi-step process, beginning with a telechelic diiodo oligomer of formula I-(VF$_2$-co-PMVE)-I. The latter was made by the process disclosed in U.S. 20090105435 A1. This diiodo oligomer contained 73.2 mol % VF$_2$ and 26.8 mol % PMVE and had a number average molecular weight of 2450 daltons.

Ethylenation of the diiodo oligomer:

A 160 mL Hastelloy (HC-276) autoclave, equipped with inlet and outlet valves, a manometer and a rupture disc, was degassed and pressurized with 30 bar of nitrogen to check for leaks. Then, a 0.5 mm Hg vacuum was operated for 5 minutes (min.) and subsequently an argon atmosphere was applied. Such a procedure of autoclave degassing was repeated five times. Under vacuum, 5.0 g (2.87×10$^{-2}$ moles) of t-butylperoxypivalate (TBPPi), 50 mL of t-butanol and 100.0 g (0.077 moles) of the above-described telechelic diiodo oligomer were transferred into the autoclave. 6.0 g of ethylene (0.214 moles) was introduced into the autoclave. Then, the autoclave was progressively heated to 75° C. An exotherm was observed of about 10° C. and an increase of pressure from 15 bars up to 18 bars, followed by a drop of pressure to 14 bars over 16 hours. After reaction, the autoclave was placed in an ice bath for about 60 minutes and 0.5 g of unreacted ethylene was slowly released. After opening the autoclave, the reaction mixture was dissolved in 100 ml of butanone and washed with distilled water (2×100 ml), Na$_2$S$_2$O$_5$ solution (100 ml) and brine (100 ml) respectively in a separating funnel. Then, the organic phase was dried over MgSO$_4$ and filtered through sintered glass (G4). The organic solvent was removed by a rotary vacuum evaporator at 40° C., reducing pressure to 10 mm Hg. The resulting slightly yellow viscous liquid was dried at 40° C. under 0.01 mbar vacuum to constant weight. The yield of the reaction was 91%. The product was analyzed by $^{1}$H NMR and $^{19}$F NMR spectroscopy. An absence of the signal corresponding to the terminal —CF$_2$I (approximately –39 ppm) indicated quantitative conversion to the ethyleneated oligomer.

Hydrolysis of Ethylenated Copolymer to the Telechelic Diol:

To a 250 ml two-neck round-bottom flask equipped with a reflux condenser and magnetic stirrer was introduced 61.6 g (0.044 moles) of ethylenated product synthesized above and 80.4 g (1.1 moles) of DMF. Then, the mixture was purged with nitrogen for 20 min. and 4.0 g of water was added through a septum. The reaction was heated to 120° C. and stirred overnight. After 14 hours (hrs.), the crude product (reaction mixture) was cooled to room temperature and a mixture of H$_2$SO$_4$ (25 g) in methanol (70 g) was added dropwise. The reaction was kept at room temperature for 24 hrs. Then, the reaction mixture was washed with distilled water (3×100 ml) and ethyl acetate (200 ml) in a separating funnel. The organic phase was dried over MgSO$_4$ and filtered through sintered glass (G4). The ethyl acetate and traces of DMF were removed by rotary vacuum evaporator (40° C./20 mm Hg). The resulting brown viscous liquid was dried at 40° C. and 0.01 mbar to constant weight. The product (yield 74 wt %) was analyzed by $^{1}$H NMR and $^{19}$F NMR spectroscopy.

Alternative Process for Hydrolysis of Ethylenated Copolymer:

A 50 ml two-neck round-bottom flask equipped with a reflux condenser and magnetic stirrer was charged with 3.1 g (0.0021 moles) of ethylenated copolymer and 16 g (0.22 moles) of DMF. This mixture was stirred for 30 min. under nitrogen atmosphere. Then 1 g of water was added dropwise through a septum. The reaction was heated up to 100° C. and kept stirring for 36 hours. After cooling to room temperature, 50 ml of butanone was added and the resulting mixture was washed with water (3×50 ml). The organic layer was dried over MgSO$_4$ and filtered through sintered glass (G4). The solvents were removed using a rotary vacuum evaporator (40° C./20 mm Hg). The resulting brown viscous liquid was dried at 40° C. and 0.01 mbar to constant weight. The products (yield 54 wt %) were analyzed by $^{1}$H NMR, $^{19}$F NMR proving the presence of both diol and diformate.

Saponification of the Diformate:

A 100 ml two-neck round-bottom flask equipped with a Claisen condenser and magnetic stirrer was charged with 1.39 g of hydrolyzed di-adduct (prepared above), 0.05 g (0.29 mmoles) of p-toluenesulfonic acid and 50 ml of CH$_3$OH. The reaction was heated until the methanol started to distill. Then, the reaction mixture was washed with water (2×50 ml), CH$_2$Cl$_2$ (3×30 ml) and brine (50 ml) was added to facilitate the separation. The organic layer was dried over MgSO$_4$ and filtered through sintered glass (G4). The CH$_2$Cl$_2$ and traces of MeOH were removed by a rotary vacuum evaporator (40° C./20 mm Hg). The resulting brown viscous liquid was dried at 40° C. and 0.01 mbar to constant weight. The product (yield 81 wt %) was analyzed by $^{1}$H NMR and $^{19}$F NMR proving the presence of diol.

Conversion to the Diacrylate:

A 250 ml two-neck round-bottom flask equipped with a reflux condenser and magnetic stirrer was charged with 25.0 g (19.2 mmoles) of diol synthesized above dissolved in 100 ml of THF (dried), and 12 g of poly(vinylpyridine). The reaction mixture was cooled to 0° C. under nitrogen atmosphere and 20 mg (0.18 mmoles) of hydroquinone were added. Acryloyl chloride was added by syringe through a septum in four subsequent doses (4 g, 4 g, 2 g, 4 g, respectively) in the interval of 6 hrs. An additional 10 g of poly(vinylpyridine) was added to the reaction mixture. After addition of the first dose of acryloyl chloride, the reaction temperature was kept at 40° C. over a period of 48 hrs. Poly(vinylpyridine) was removed by filtration through sintered glass G4. Then a butanone/water (1/1) mixture was added and subsequently washed with water. The organic layer was dried over $MgSO_4$ and then filtered through sintered glass (G4).

The solvents and excess acryloyl chloride were removed using a rotary vacuum evaporator (40° C./20 mm Hg). The resulting brown viscous liquid was dried at 40° C. under 0.01 mbar vacuum to constant weight. The product (yield 81%) was analyzed by $^1H$ and $^{19}F$ NMR.

Example 2

In this example, a fluoropolymer of the invention, $CH_2$=CHCOO—$(CH_2)_3$—R—$(CH_2)_3$—OOCCH=$CH_2$, wherein R is poly(vinylidene fluoride-co-perfluoro(methyl vinyl ether) [i.e. poly($VF_2$-co-PMVE)], was made by the process of the invention. The telechelic I-($VF_2$-co-PMVE)-I oligomer starting material was the same as that employed in Example 1.

Conversion to the Diiodohydrin:

A 100 ml two-neck round-bottom flask equipped with a reflux condenser and a magnetic stirrer was charged with 10.5 g (6 mmoles) of I-(VF2-co-PMVE)-I, 2.05 g (34.4 mmoles) of allyl alcohol and 50 ml of $CH_3CN$. Then the flask was heated to 80° C. AIBN (2,2'-azobisisobutyronitrile) was added in 10 doses (20 mg each) with the addition interval of 30 min. The reaction was conducted under nitrogen atmosphere at 80° C. for 21 hours. After cooling to room temperature, the reaction mixture was filtered through cotton and then the solvent and excess allyl alcohol were removed on a rotary vacuum evaporator (40° C./20 mm Hg). The resulting slightly yellow viscous liquid was dried (40° C./0.01 mbar) to constant weight. The product (yield 93%) was analyzed by $^1H$ and $^{19}F$ NMR, and FT-IR spectroscopy.

Reduction of the Diiodohydrin to the Bis(Propyl Alcohol):

A 250 ml three-neck round bottom flask equipped with a reflux condenser and a magnetic stirrer was charged with 11.5 g (6.6 mmoles) of the above-prepared diiodohydrin, 4.8 g (16.5 mmoles) of $Bu_3SnH$ and 50 ml of $CH_3CN$. Then the flask was heated to 70° C. AIBN was added in 10 doses (55 mg each) with an interval of 60 min. between additions. The reaction was conducted under nitrogen atmosphere at 70° C. for 12 hours. After cooling to room temperature, 0.6 g of KF was added together with 50 ml of $Et_2O$. Then the reaction was stirred at about 25° C. for 24 hours. The reaction mixture was filtered through sintered glass (G5) to remove white solid such as $Bu_3SnK$, $Bu_3SnF$ or $Bu_3SnI$. The solvents were removed on a rotary vacuum evaporator (40° C./20 mm Hg). The crude product was dissolved in 50 ml of butanone and washed with water (2×50 ml). The organic layer was dried over $MgSO_4$ which was then filtered through sintered glass (G4). The butanone was partly removed on a rotary vacuum evaporator and residue was precipitated from pentane. After cooling 12 hours at 4° C., pentane was carefully removed from the precipitated product by decantation. The residual solvent was removed by rotary vacuum evaporation (40° C./20 mm Hg). The resulting light yellow viscous liquid was dried (40° C./0.01 mbar) to constant weight. The product (overall yield 91%) was analyzed by $^1H$ and $^{19}F$ NMR and FT-IR spectroscopy. The decanted pentane was also evaporated to give a low molecular weight fraction of the desired diol.

Acrylation of the Diol:

A 100 ml three-neck round bottom flask equipped with a reflux condenser and a magnetic stirrer was charged with 5.03 g (3.33 mmoles) of the above-prepared bis(propyl alcohol), 25 ml of THF, 4.5 g of poly(vinylpolypyrolidone), 5 mg (0.045 mmoles) of hydroquinone and cooled to 0° C. Then acryloyl chloride (4.456 g, 4 ml, 50 mmoles) was added dropwise in three doses (2 ml, 1 ml & 1 ml). After the first addition of acryloyl chloride, the reaction temperature was increased to 40° C.; the two subsequent additions were completed after elapsed times of 5 and 22 hours. An additional amount of poly(vinylpolypyrolidone) (4.5 g) was then added to the reaction mixture. The reaction was conducted under nitrogen atmosphere at 40° C. for 48 hours. After cooling to room temperature, the reaction mixture was filtered through sintered glass (G4) to remove poly(vinylpolypyrolidone). The filtered poly(vinylpolypyrolidone) was washed with THF. The solvent was partly removed by rotary evaporation and residue was precipitated from pentane. After 12 hours at 4° C., the pentane was carefully decanted, leaving the precipitated product. The residual solvent was removed by rotary vacuum evaporation (40° C./20 mm Hg). The resulting pale yellow viscous liquid was dried (40° C./0.01 mbar) to constant weight. The product (overall yield 91%) was analyzed by $^1H$ and $^{19}F$ NMR. The decanted pentane was also evaporated and returned a low yield (7%) of a low molecular weight fraction of the desired polymer.

What is claimed is:

1. A telechelic diacrylate copolymer of formula $CH_2$=CR'COO—$(CH_2)_n$—R—$(CH_2)_n$—OOCCR'=$CH_2$, wherein R' is H or —$CH_3$, n is 2 or 3 and R is an oligomer having a number average molecular weight of 1000 to 25,000 daltons, said oligomer selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin.

2. A telechelic diacrylate copolymer of claim 1 wherein said oligomer has a number average molecular weight of 1200 to 12,000 daltons.

3. A telechelic diacrylate copolymer of claim 2 wherein said oligomer has a number average molecular weight of 1500 to 5000 daltons.

4. A telechelic diacrylate copolymer of claim 1 wherein said oligomer comprises copolymerized units selected from the group consisting of i) vinylidene fluoride, tetrafluoroethylene and perfluoro(methyl vinyl ether); ii) tetrafluoroethylene, perfluoro(methyl vinyl ether) and ethylene; iii) vinylidene fluoride, hexafluoropropylene and tetrafluoroethylene; and iv) tetrafluoroethylene, vinylidene fluoride and propylene.

* * * * *